(12) United States Patent
Paul

(10) Patent No.: US 6,687,817 B1
(45) Date of Patent: Feb. 3, 2004

(54) CONFIGURATION OF A NETWORK DEVICE VIA THE NETWORK

(75) Inventor: Stephen D. Paul, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 09/712,649

(22) Filed: Nov. 14, 2000

(51) Int. Cl.[7] .............................................. G06F 15/177
(52) U.S. Cl. ........................................... 713/1; 709/220
(58) Field of Search ............................ 713/1; 709/220, 709/222

(56) References Cited

U.S. PATENT DOCUMENTS 6,061,332 A * 5/2000 Branton, Jr. et al. ........ 370/241
6,496,858 B1 * 12/2002 Frailong et al. ............ 709/221

* cited by examiner

*Primary Examiner*—Thomas M. Heckler
(74) *Attorney, Agent, or Firm*—Blakely, Sokoloff, Taylor & Zafman

(57) ABSTRACT

A method and apparatus are provided that configure a new network device via the network. The method consists of initiating a boot sequence on a first device. The boot process is suspended prior to performing network set up. The new device sends a configuration request to a computer on the network. The computer generates configuration data for the new device and sends configuration data the new device via a multicast message. The new device then writes the configuration data into a file used by an operating system for network configuration on the first device and continues the boot sequence.

45 Claims, 7 Drawing Sheets

CONFIGURATION OF A NETWORK DEVICE VIA THE NETWORK

FIELD OF THE INVENTION

The invention relates generally to the field of computer networks. More particularly, the invention relates to configuring a network attached device through the network.

BACKGROUND OF THE INVENTION

Computer networks have become commonplace and heavily relied upon tools. While actual implementations of a network can vary greatly, a generic representation of a network can be given. FIG. 1 is a block diagram illustrating a typical network. In this example an Ethernet network 110 is shown. Such a network may utilize the common Transmission Control Protocol/Internet Protocol (TCP/IP). Of course, many other types of networks and protocols are available and are commonly used. However, for illustrative purposes, Ethernet and TCP/IP will be referred to.

Connected to this network 110 are computers 120, 130, and 160 and other devices 140 and 150. The computers 120, 130, and 160 may include a network administrator terminal 120. A human operator could use this network administrator terminal 120 to monitor and maintain the network. The devices 140 and 150 may include network attached storage devices such as a redundant array of independent disks (RAID) or other types of devices. The number and arrangement of this equipment may vary depending on the application.

In order to remain useful over time, such a network must be scalable. In other words, making additions to the network must be relatively easy. Normally, whenever a new device is added to an existing computer network it must be configured to operate within that network. Information must be provided to the device to be used by the setup programs in the operating system of the device. This information can include the IP address, device name, domain name and others.

FIG. 2 is a block diagram illustrating a prior art approach to configuring a new device attached to a network. In this example a network 210 made up of computers 220, 230, and 260 and a device 240 is illustrated. A new device 250 is added to the network 210. However, before this device 250 can be accessed through the network 210, it must be configured to communicate on that network. Therefore, configuration of the new device 250 cannot be done using the existing computers 220, 230, or 260 on the network 210. A common method of configuring the new device 250 is to connect a configuration tool 270 such as a laptop computer to the new device 250 using a serial link 280. A human operator can then write the proper configuration data to the new device 250 through the configuration tool 270. Once the configuration data has been set, the new device 250 can be rebooted and begin operating in the network 210.

One drawback to such a method is that the new device must be completely booted and then, after configuration is done, rebooted so that the operating system can rerun network setup programs utilizing the new configuration data. Such a process is time consuming and frustrating for human operators.

Another drawback of this method is the need for additional equipment. Since the new device cannot communicate on the network until configured, existing computers cannot be used to write the configuration data to the new device thereby necessitating additional equipment, such as the configuration tool 270.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

A method and apparatus are provided that configure a network device via the network. According to one embodiment, the method consists of initiating a boot sequence on the device. The boot process is suspended via software or scripts prior to performing network set up. The device multicasts a configuration request to any computer on the network that may be listening for such a request. The system that received the request generates configuration data for the device and sends configuration data to the device via a multicast message. The device then writes the configuration data into a file or files used by an operating system for network configuration on the device and continues the boot sequence with the new configuration set.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various embodiments, which will be described below. These embodiments of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of medial/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to Ethernet, TCP/IP, and network attached storage devices, the method and apparatus described herein are equally applicable to other network protocols that allow for multicasting and other types of network devices. For example, the techniques described herein are thought to be useful in connection with other network protocols that use logical addressing.

Figure 1:
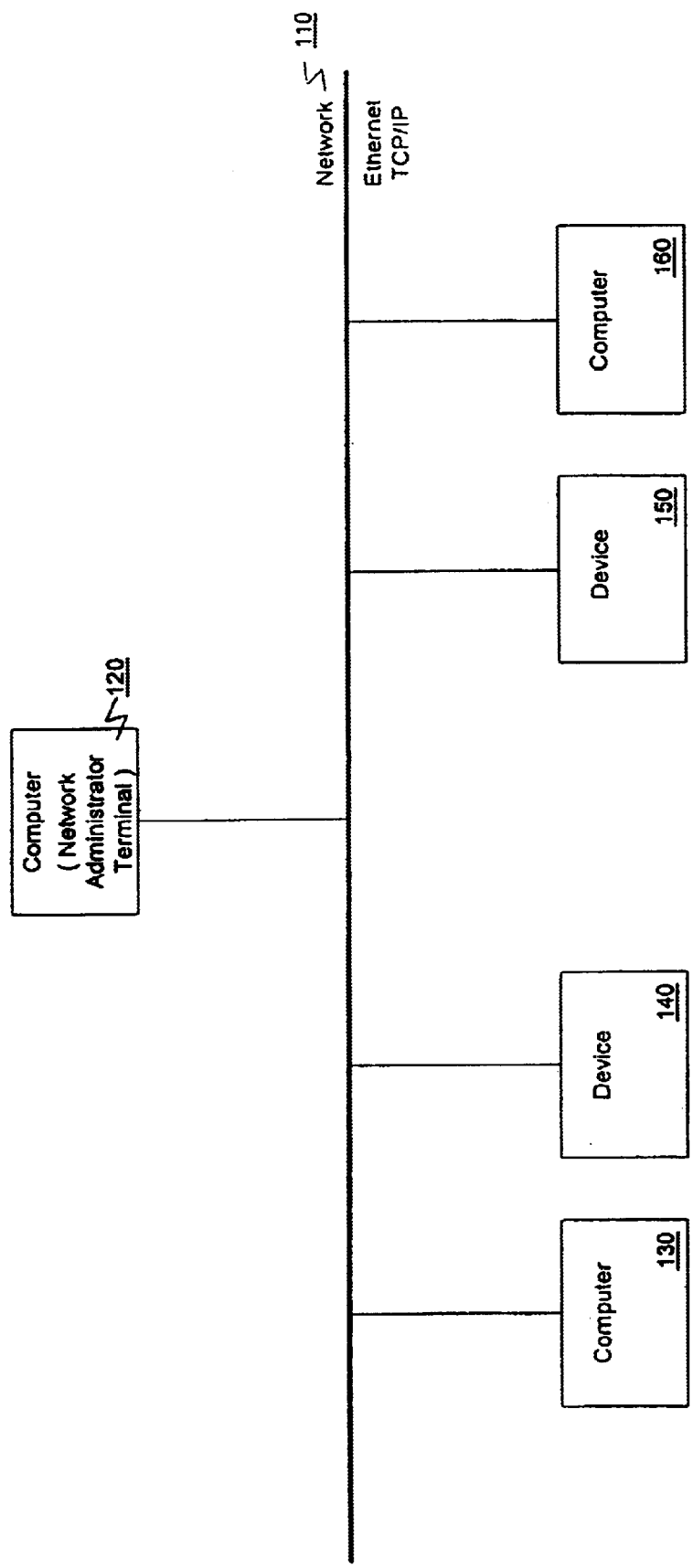
FIG. 1 is a block diagram illustrating a typical network upon which the present invention may be implemented.
Figure 2:
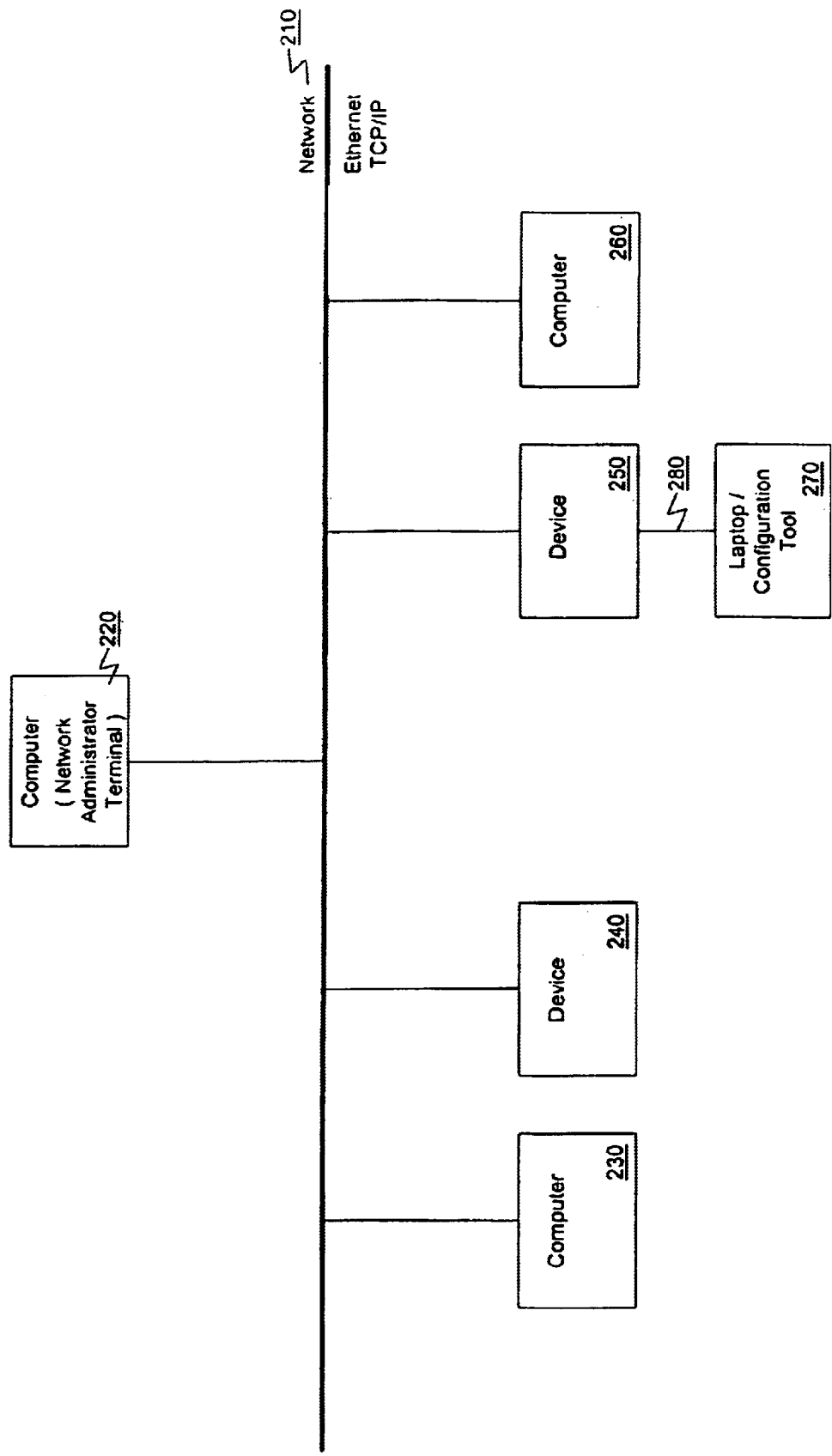
FIG. 2 is a block diagram illustrating a prior art approach to configuring a new device attached to a network.
Figure 3:
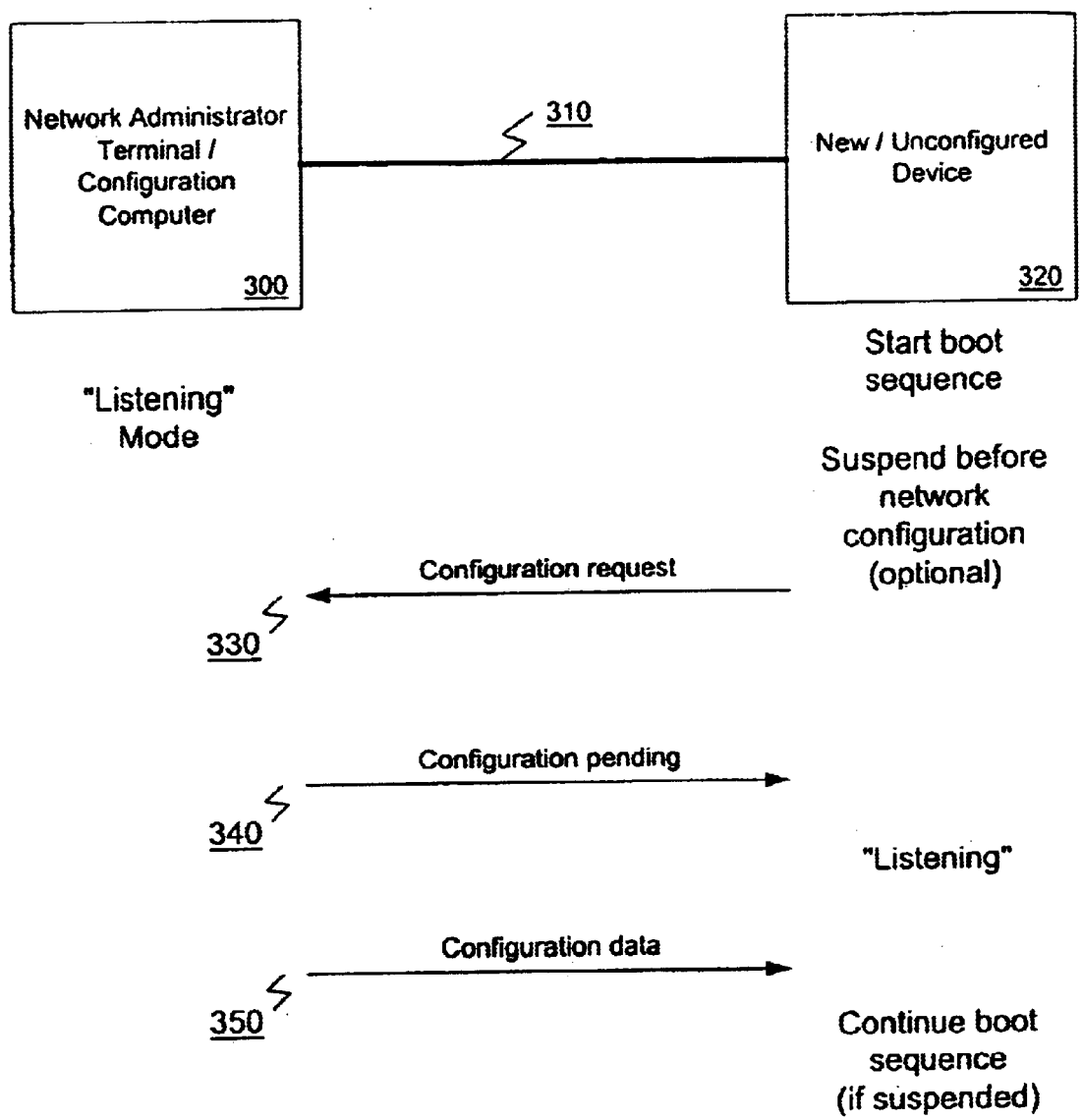
FIG. 3 is a block diagram illustrating a conceptual view of a process for configuring a device connected to a network according to one embodiment of the present invention.

FIG. 3 is a block diagram illustrating a conceptual view of a process for configuring a device connected to a network according to one embodiment of the present invention. In this example, a computer 300 that is to function as a network administrator terminal or configuration computer is connected to a network 310 to which a device 320 has been added. Initially, after the configuration computer 300 has booted, it enters a "listening mode." In this mode, it is waiting to detect a new device 320 being added to the network 310.

When the new device 320 is added to the network 310 and powered up, the new device 310 begins its boot up process. In this example, before the new device 310 configures the network settings it suspends the boot process and multicasts a configuration request 330 on the network 310. Alternatively, the new device may not suspend the boot process and then later reboot. The new device 320 generates a worldwide unique identifier that is placed in the configuration request for use in subsequent transmissions to the new device. In one embodiment of the current invention, the unique identifier may be network interface card's Ethernet hardware address. Alternatively, any other unique identification number may be used. The configuration request message is sent to a predetermined multicast port on the configuration computer 300. The new device 320 will repeatedly send the configuration request 330 until the configuration computer 300 responds.

The configuration computer 300 responds by sending via multicast a "configuration pending" message 340 on the network 310. The message contains the unique identifier generated by the new device in order to mark the message as intended for that particular device. By sending a multicast message all devices on the network can receive the message including the device 320. Devices that are already configured or have an identifier different from that included in the message can ignore the message.

After the new device 320 receives the configuration pending message 340, it enters a listening mode to wait for configuration data 350 to be sent from the configuration computer 300. The configuration computer 300 then generates the configuration data 350 and sends it to the new device 320 via multicast. If the new device 320 had suspended the boot process, the process can now be resumed and completed using the configuration data. If the boot process was not suspended, the new device should reboot and reconfigure using the new configuration data.

The configuration data 350 can be generated at the configuration computer 300 in at least two ways. First, the configuration computer 300 can open a graphical user interface and allow a human operator to enter all the configuration data. Alternatively, the configuration computer 300 may automatically determine the configuration data from a predetermined list of valid set up data stored internally or received from an external source. It is also contemplated that various combinations of these two alternatives may be possible. For example, the set up data may be automatically determined by the configuration computer and then presented to a human operator for approval or modification before being set to the new device.

Figure 4:
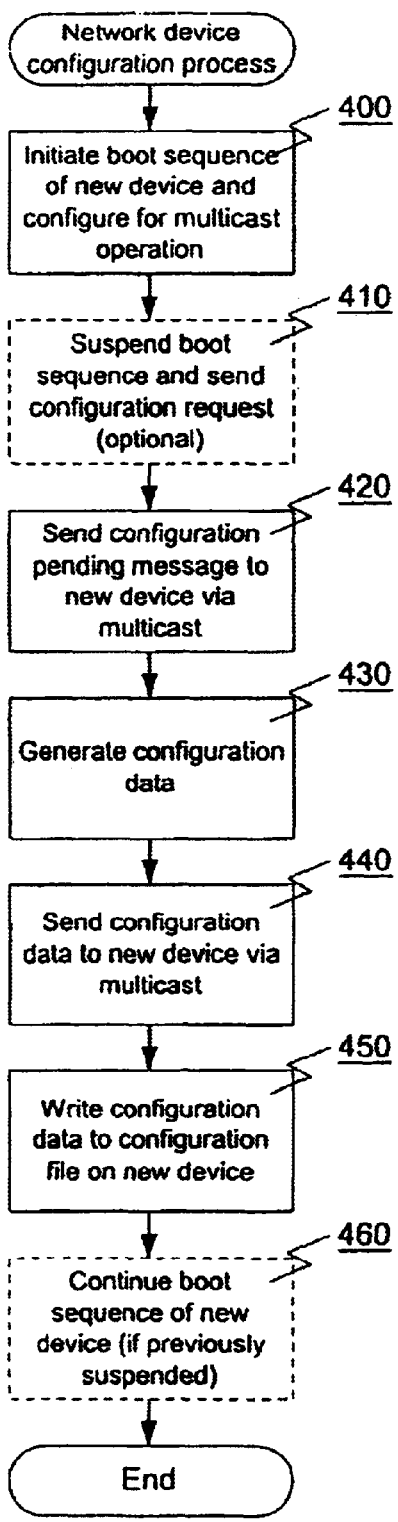
FIG. 4 is a flow chart illustrating a conceptual view of a process for configuring a device connected to a network according to one embodiment of the present invention.

FIG. 4 is a flow chart illustrating a conceptual view of a process for configuring a device connected to a network according to one embodiment of the present invention. First, at processing block 400, the boot sequence for the new device is initiated and the new device is configured to perform multicast operations. In order to avoid rebooting, the boot sequence can be suspended before network configuration is performed and the new device sends a configuration request at block 410 to a predetermined multicast port on another computer connected to the network. However, suspending the boot process is optional. Alternatively, the boot process can be completed and later, after the configuration data is received, the new device can be rebooted.

At processing block 420, the computer receiving the configuration request and performing the configuration responds by sending a configuration pending message to the new device via multicast. The new device, upon receiving the configuration pending message enters a listening mode for a predetermined length of time and waits for the configuration data. The computer performing configuration then generates configuration data at processing block 430. As noted above, this configuration data can be generated automatically or can be entered by a human operator using a graphical user interface on the computer performing the configuration. The configuration data is sent to the new device via multicast at processing block 440.

The new device, upon receiving the configuration data at processing block 450, then writes the configuration data to a file or files in the new device that the operating system will use to perform network configuration on the new device. Finally, at processing block 460, if the boot process had previously been suspended, the new device resumes the boot process and configures network settings, thereby allowing the new device to function within the network. In this manner, the new device need only perform the boot process once and no additional configuration equipment is necessary. Alternatively, if the boot process had not been suspended, the new device should be rebooted to allow configuration with the new configuration data.

Figure 5:
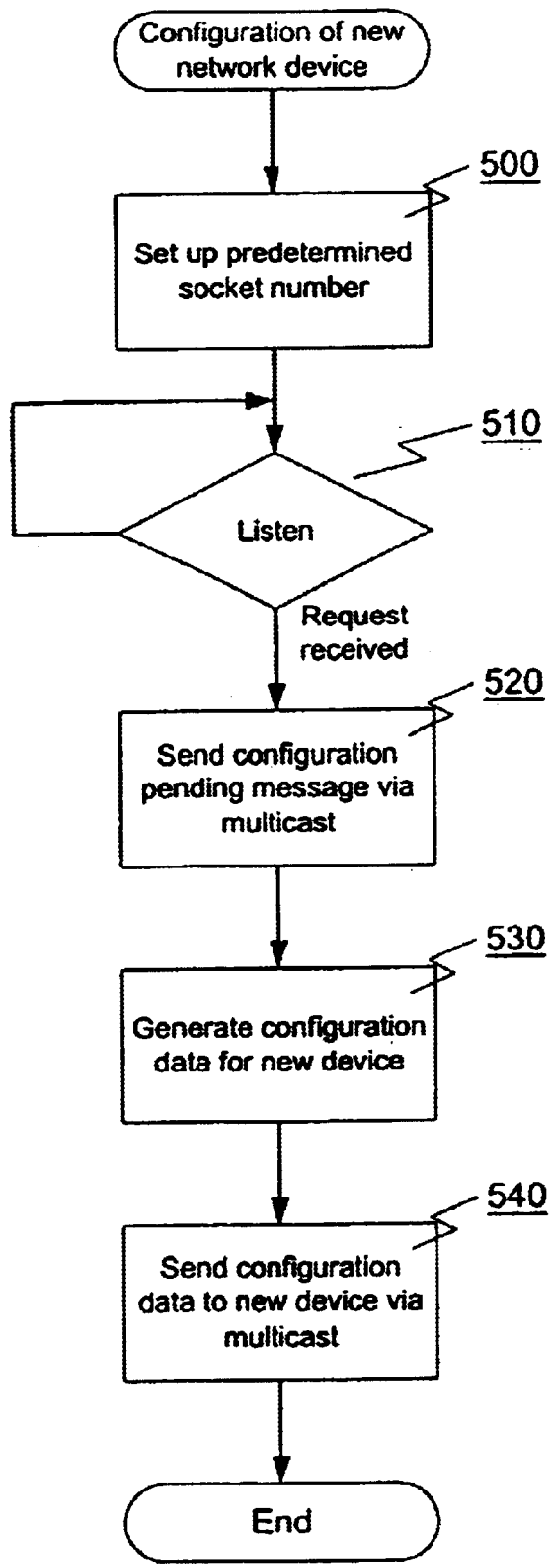
FIG. 5 is a flow chart illustrating a process for a device connected to a network to perform configuration of a device connected to the network according to one embodiment of the present invention.

FIG. 5 is a flow chart illustrating a process for a device connected to a network to perform configuration of a device connected to the network according to one embodiment of the present invention. This process, according to one embodiment of the present invention, is executed by a computer connected to the network and functioning as a network administrator terminal. Initially, at processing block 500, the configuration computer sets up a socket with a predetermined number. This number will also be pre-coded into the new device's operating system. Next, the configuration computer begins listening to the socket at decision block 510. Once a configuration request is received at decision block 510, the configuration computer sends a configuration pending message to the new device via multicast at processing block 520. The configuration computer then, at processing block 530, generates configuration data. As explained above, this configuration data can be generated automatically or by a human operator using the configuration computer. Finally, at processing block 540, the configuration data is sent to the new device via multicast.

Figure 6:
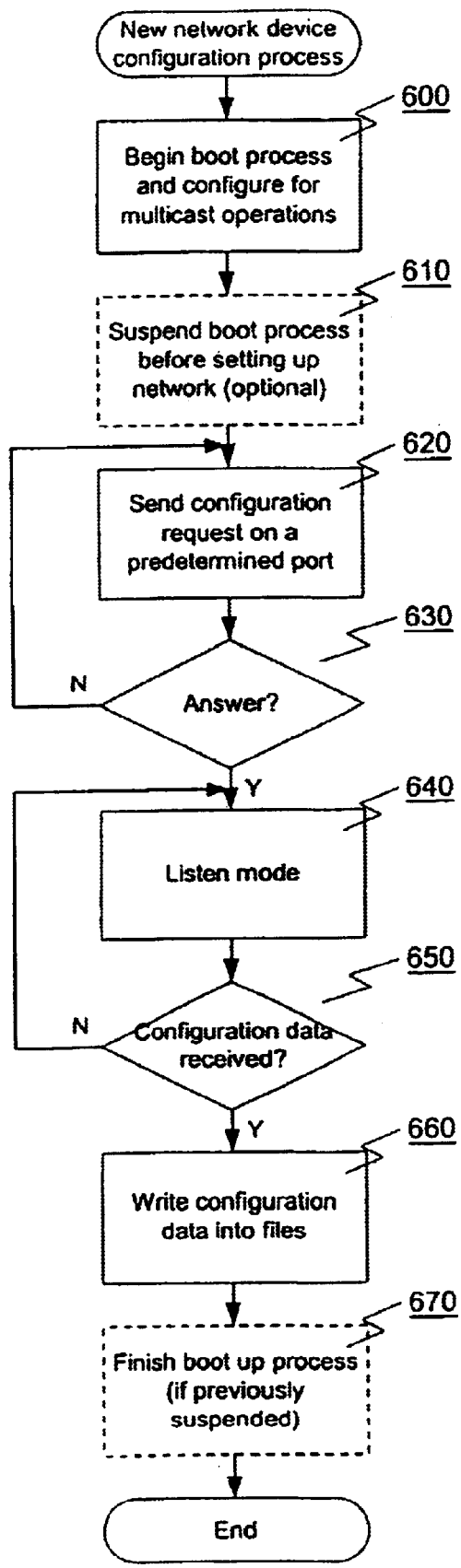
FIG. 6 is a flow chart illustrating a process for a device connected to a network to configure network settings according to one embodiment of the present invention.

FIG. 6 is a flow chart illustrating a process for a device connected to a network to configure network settings according to one embodiment of the present invention. Such a process is, according to one embodiment of the present invention, performed by the operating system of a device to be added to a network. First, at processing block 600, the new device begins the normal boot sequence including configuring the new device for multicast operations. However, according to one embodiment of the present invention, prior to configuring network settings, the boot sequence is suspended at processing block 610. Alternatively, the boot process may be completed. The new device then, at processing block 620, sends a configuration request on a predetermined port to another computer on the network. The new device then waits for an answer at decision block 630. If no answer, or configuration pending message has been received at decision block 630, the new device continues to repeatedly send configuration requests at processing block 620. When a configuration pending message is received at decision block 630 the new device then enters a listen mode at processing block 640. If, at decision block 650 no configuration data has yet been received, the new device continues to listen for the data at processing block 640. Alternatively, if no configuration data is received for a predetermined period of time, the process may resend the configuration request and continue waiting for the predetermined period.

If configuration data has been received at decision block 650, the new device then writes the configuration data into files to be used by the operating system in configuring the network at processing block 660 and, if the boot process was previously suspended, finishes the boot process at processing block 670 including configuring the network. If the boot process was not suspended, the new device should be rebooted to allow the new device to be configured with the new configuration data.

Figure 7:
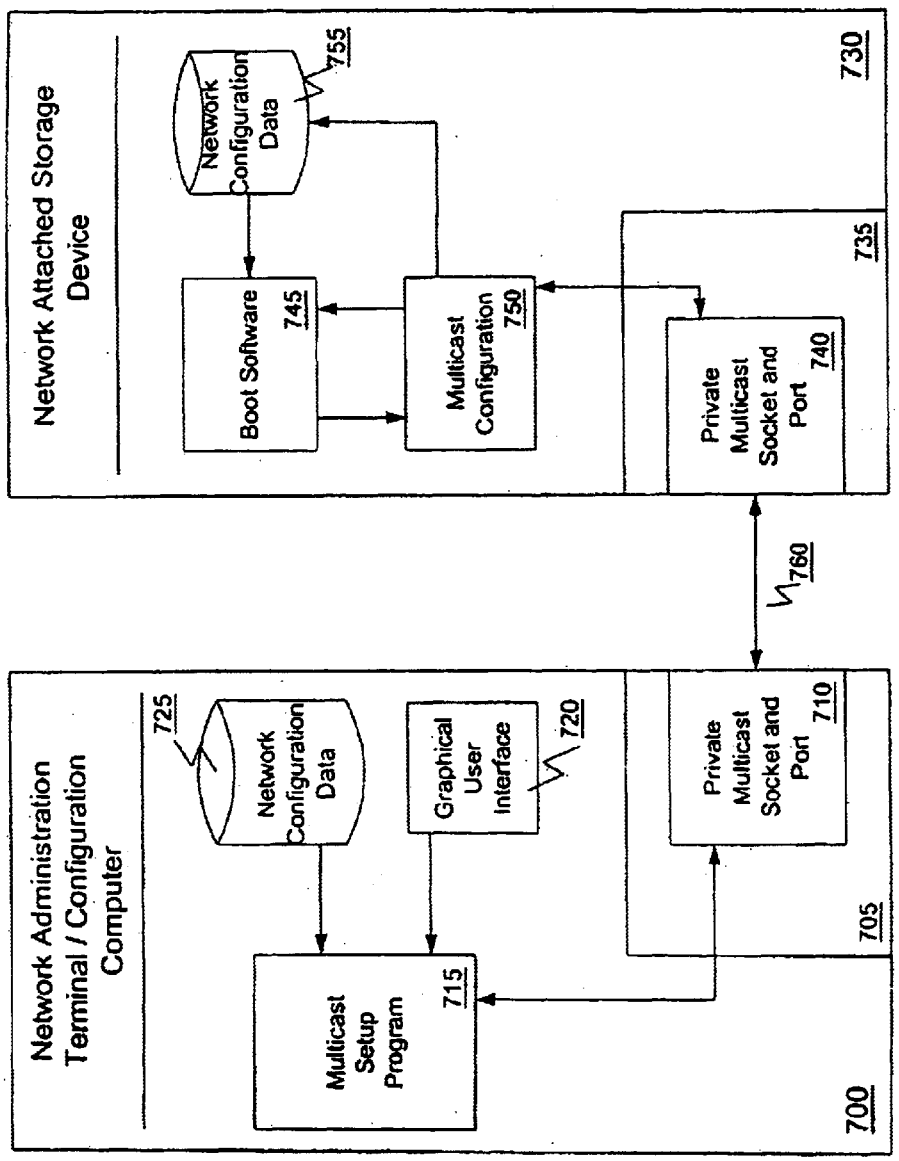
FIG. 7 is a block diagram illustrating a more detailed architectural view of a system for configuring a device connected to a network according to one embodiment of the present invention.

FIG. 7 is a block diagram illustrating a more detailed architectural view of a system for configuring a device connected to a network according to one embodiment of the present invention. In this example, a network attached storage (NAS) device 730 is connected to a network 760 that also has connected a network administration terminal or configuration computer 700. Both the configuration computer 700 and the NAS device 730 contain network cards 705 and 735. Each of these network cards 705 and 735 contain private multicast sockets and ports 710 and 740 for connecting each device to the network 760.

The configuration computer 700 contains a multicast setup program 715 that is used to setup the private multicast socket and port 710. To setup the NAS device 730 via the network 760, the multicast setup program 715 can, responsive to a request from the NAS device 730, notify a human operator of the presence of a new device and read setup data supplied by the human operator using a graphical user interface 720. Alternatively, the multicast setup program 715 can read setup data a file or files stored on disk containing network configuration data 725. The network configuration data 725 can contain a list of valid configurations for new devices such as the NAS device 730 added to the network 760. Whether the configuration data is supplied by a human operator using a graphical user interface 720 or from a file or files containing network configuration data 725, the multicast setup program 715 sends the configuration data through the private multicast socket and port 710 over the network 760 to the NAS device 730.

According to one embodiment of the present invention, this software is written in Java and makes use of the Java TCP/IP multicast facilities. When started, the multicast setup program 715 enters a listening state where it listens for a specific Java object sent from the NAS device 730. Once the object is received, the configuration computer 700 sends the NAS device 730 a response Java object notifying the NAS device 730 that the configuration data is pending. The configuration computer 700 then notifies the user of a new device on the network and gathers TCP/IP configuration information via a graphical user interface 720. Once the TCP/IP configuration information is received and validated, the multicast setup program 715 builds a specific TCP/IP configuration setup object and sends this object over the private multicast socket and port 710 the NAS device 730 is listening on.

The NAS device 730 contains boot software 745. Once the NAS device 730 is powered up, the boot software 745 begins to run. Software is written to interrupt the boot software 745 before any network configuration takes place. Using operating system facilities, the network card 735 is only configured to enable multicast operations. The multicast configuration program 750 then sends a configuration request to the configuration computer 700 via the network 760. Upon receiving configuration data from the configuration computer 700, the multicast configuration software 750 writes the configuration data to a file or files containing network configuration data 755 and instructs the boot software 745 to continue with setup.

According to one embodiment of the present invention, this software is written in Java and makes use of the Java TCP/IP multicast facilities. The multicast configuration program 750 contains new facilities to send and receive Java objects over a predetermined multicast socket and ports 740. After initialization, this software 750 periodically sends a Java object which announces that the NAS device 730 is a device needing configuration. Once a configuration computer 700 anywhere on the network 760 responds that a configuration is pending, the multicast configuration program 750 enters a multicast listening state. It listens until a specific configuration object is received, containing TCP/IP configuration information. Once the multicast configuration program 750 receives this object, it updates the operating system network configuration data 755 and resumes the operating system boot process with the new TCP/IP information already stored and available.

What is claimed is:
1. A method of configuring a network device comprising:
    sending a configuration request from a first device to a second device via multicast;
    generating configuration data for the first device on the second device;
    sending configuration data from the second device to the first device via multicast; and
    writing configuration data into one or more files used by an operating system for network configuration on the first device.
2. The method of claim 1, further comprising:
    initiating a boot sequence on the first device;
    suspending the boot sequence prior to performing network set up and prior to said sending a configuration request;
    continuing the boot sequence on the first device after said writing of configuration data into one or more files is complete.
3. The method of claim 1, wherein said network utilizes the TCP/IP protocol.

4. The method of claim 1, wherein said device comprise a network attached storage device.

5. The method of claim 1, wherein said sending a configuration request occurs on a predetermined port.

6. The method of claim 1, wherein said sending configuration data to the first device comprises sending a packet via TCP/IP multicast.

7. The method of claim 6, wherein said packet comprises a Java object.

8. The method of claim 1, wherein said generating configuration data comprises opening a graphical user interface to allow a human operator to enter configuration data.

9. The method of claim 1, wherein said generating configuration data comprises automatically selecting configuration data from a list of valid configuration data.

10. A method of configuring a network device comprising:

setting up a multicast socket with a predetermined number for communication with the network device;

listening to the socket for a configuration request from the network device;

responsive to receiving the configuration request on the socket, acknowledging the configuration request via multicast;

generating configuration data for configuring the network device; and sending the configuration data to the network device via multicast.

11. The method of claim 10, wherein said generating set up data comprises opening a graphical user interface to allow a human operator to enter configuration data.

12. The method of claim 10, wherein said generating set up data comprises automatically selecting configuration data from a list of valid configuration data.

13. The method of claim 10, wherein said device comprises a network attached storage device.

14. The method of claim 10, wherein said configuration request, configuration pending message and configuration data further comprise packets sent via TCP/IP multicast.

15. The method of claim 14, wherein said packets further comprise Java objects.

16. A method of configuring a network device comprising:

sending a configuration request on a predetermined multicast port of the network device;

responsive to receiving a configuration pending message on the predetermined multicast port, listening for a packet containing configuration data; and writing the configuration data into one or more files used by an operating system of the network device for configuring network settings.

17. The method of claim 16, further comprising:

initiating a boot sequence on a first device;

suspending the boot sequence prior to performing network set up;

continuing the boot sequence on the first device after said writing of configuration data into one or more files is complete.

18. The method of claim 16, wherein said network utilizes the TCP/IP protocol.

19. The method of claim 16, wherein said device comprises a network attached storage device.

20. The method of claim 16, wherein said sending configuration data to the first device comprises sending a packet via TCP/IP multicast.

21. The method of claim 20, wherein said packet comprises a Java object.

22. A network configuration device comprising:

a storage device having stored therein a configuration routine for configuring a second device coupled to a network; and a processor coupled with said storage device which, when executing said configuration routine, configures said second device by;

setting up a multicast socket with a predetermined number for communication with the second device, listening to the socket for a configuration request from the second device, responsive to receiving the configuration request on the socket, acknowledging the configuration request via multicast, generating configuration data appropriate for the second device, and sending the configuration data to the second device via multicast.

23. The network configuration device of claim 22, wherein said generating set up data comprises opening a graphical user interface to allow a human operator to enter configuration data.

24. The network configuration device of claim 22, wherein said generating set up data comprises automatically selecting configuration data from a list of valid configuration data.

25. The network configuration device of claim 22, wherein said device comprises a network attached storage device.

26. The network configuration device of claim 22, wherein said configuration request, configuration pending message and configuration data further comprise packets sent via TCP/IP multicast.

27. The network configuration device of claim 22, wherein said packets further comprise Java objects.

28. A network device comprising:

a storage device having stored therein a configuration routine; and a processor coupled with said storage device which, when executing said configuration routine, configures said network device by;

repeatedly sending a configuration request on a predetermined multicast port of the network device;

responsive to receiving s configuration pending message on the predetermined multicast port, listening for a packet containing configuration data; and writing the configuration data into one or more files used by an operating system of the network device for configuring network settings.

29. The network device of claim 28, wherein said configuration routine further comprises:

initiating a boot sequence on a first device;

suspending the boot sequence prior to performing network set up;

continuing the boot sequence on the first device after said writing of configuration data into one or more files is complete.

30. The network device of claim 28, wherein said network utilizes the TCP/IP protocol.

31. The network device of claim 28, wherein said device comprises a network attached storage device.

32. The network device of claim 28, wherein said configuration request, configuration pending message and configuration data further comprise packets sent via TCP/IP multicast.

33. The network device of claim 28, wherein said packets further comprise Java objects.

34. A machine-readable medium having stored thereon data representing sequences of instructions, said sequences of instructions which, when executed by a processor, cause said processor to configure a network device by:

setting up a multicast socket with a predetermined number for communicating with the network device;

listening to the socket for a configuration request from the network device;

responsive to receiving the configuration request on the socket, acknowledging the configuration request via multicast;

generating configuration data appropriate for configuring the network device; and sending the configuration data to the network device via multicast.

35. The computer readable medium of claim 34, wherein said generating configuration data comprises opening a graphical user interface to allow a human operator to enter configuration data.

36. The computer readable medium of claim 34, wherein said generating configuration data comprises automatically selecting configuration data from a list of valid configuration data.

37. The computer readable medium of claim 34, wherein said device comprises a network attached storage device.

38. The computer readable medium of claim 34, wherein said configuration request, and configuration data further comprise packets sent via TCP/IP multicast.

39. The computer readable medium of claim 38, wherein said packets comprise Java objects.

40. A machine-readable medium having stored thereon data representing sequences of instructions, said sequences of instructions which, when executed by a processor, cause said processor to configure a network device by:

repeatedly sending a configuration request on a predetermined multicast port of the network device;

responsive to receiving a configuration pending message on the predetermined multicast port, listening for a packet containing configuration data; and writing the configuration data into one or more files used by an operating system of the network device for configuring network settings.

41. The computer readable medium of claim 40, further comprising:

initiating a boot sequence on a first device;

suspending the boot sequence prior to performing network set up;

continuing the boot sequence on the first device after said writing of configuration data into one or more files is complete.

42. The computer readable medium of claim 41, wherein said network utilizes the TCP/IP protocol.

43. The computer readable medium of claim 41, wherein said first device comprises a network attached storage device.

44. The computer readable medium of claim 41, wherein said writing of configuration data to the first device comprises sending a packet via TCP/IP multicast.

45. The computer readable medium of claim 44, wherein said packet comprises a Java object.

* * * * *